UNITED STATES PATENT OFFICE.

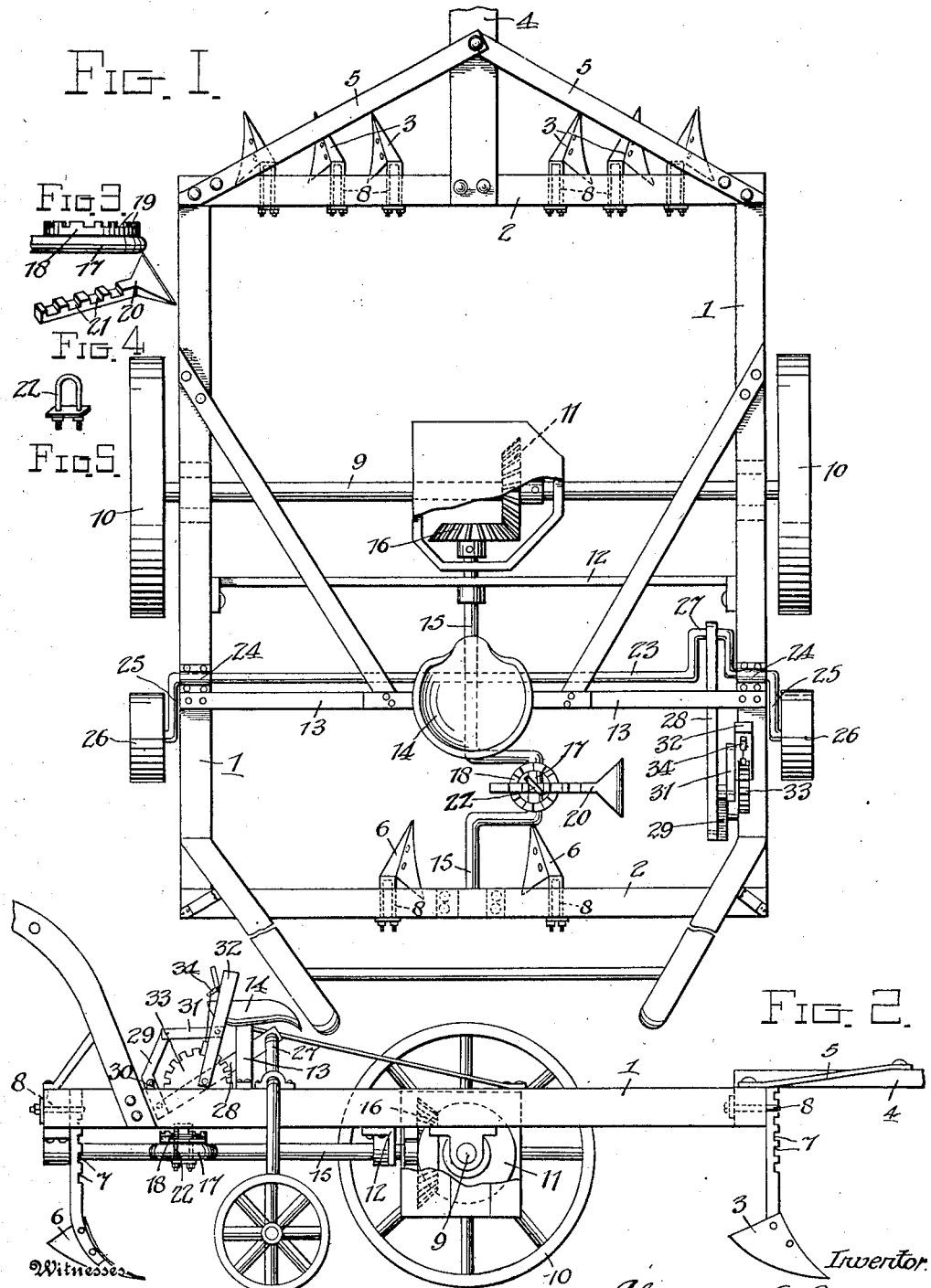

ALEXANDER A. BULLOCK, OF WILLIAMSBORO, NORTH CAROLINA.

COTTON-CHOPPER.

No. 885,432. Specification of Letters Patent. Patented April 21, 1908.

Application filed January 4, 1908. Serial No. 409,321.

*To all whom it may concern:*

Be it known that I, ALEXANDER A. BULLOCK, a citizen of United States, residing at Williamsboro, in the county of Vance and State of North Carolina, have invented certain new and useful Improvements in Cotton-Choppers, of which the following is a specification.

My invention relates to cotton choppers of that class embodying a wheeled frame and chopping members driven from the axle of the frame, and the object therefor is to provide a simple and inexpensive construction which will be highly efficient when used.

My invention specifically resides in the following features of construction, arrangement and operation which will be hereinafter described with reference to the accompanying drawings, forming a part of this specification, in which like numerals are used to designate like parts throughout the several figures and in which Figure 1 is a top plan view of my improved cotton chopper, Fig. 2 is a side elevation thereof, Fig. 3 is a fragmentary detail side view of the chopping holding frame, Fig. 4 is a perspective view of the chopping member, and Fig. 5 is an elevation of the clamp bolt for holding the chopping member.

In the practical embodiment of my invention I provide a wheeled frame comprising connected side and end members 1 and 2 respectively, the front end member having a plurality of ground opening plows 3 arranged at opposite angles upon each side of the tongue 4 extending centrally therefrom and more particularly secured by braces 5. The rear end member is provided on each side of its central point with oppositely angularly disposed closing plows 6, the shanks of said opening and closing plows, 3 and 6, being provided with a plurality of notches 7 in their length engaged by U shaped bolts 8 passing through the members 2 to hold said plows in the desired position.

Mounted transversely and through the side members 1 is an axle 9 having wheels 10 mounted thereon outside of the frame and provided with a bevel gear 11 secured thereon adjacent its central point. The side members 1 are further provided with transverse braces 12 and 13 extending therebetween, said braces 13 carrying the support for a seat 14 and said braces 12 having a crank shaft 15 journaled therein and extending through bearings centrally of the rear end member 2, said crank shaft being provided with a bevel gear 16 secured upon its forward end and meshing with the bevel gear 11 carried by the drive axle 9. The crank shaft 15 is provided upon its crank portion 17 with a circular chopper holder frame 18 having radially extending recesses 19 cut in its upper face and adapted to receive therein the shank of the chopping member or blade 20 wheih shank is provided with a series of transversely extending slotted recesses 21 over which a U-shaped clamping bolt 22 engages and is screwed tight about the crank portion 17 to hold the shank of said chopping member firmly within the selected slots of the frame 18. From this it will be readily seen that the chopping member 20 may be adjusted toward or away from the surface of the ground and also to a position angularly with relation thereto.

Mounted transversely through the main frame and in the rear of the wheels 10 thereof is a crank shaft 23 journaled through brackets 24 upon the side members 1 and provided with angular extensions 25 at the ends thereof outside of said members 1, said extensions having small wheels 26 rotatably mounted upon the ends thereof. When the machine is chopping the small wheels 26 and the extensions 25 are held in the position angular to and away from the ground while when it is desired to discontinue the chopping operation said wheels 26 are moved downwardly to engage the ground, by rocking the shaft 23, thus supporting the frame upon said wheels 26 and lifting the wheels 10 upwardly away from the ground, as shown in Fig. 2. The crank shaft 23 is provided with a crank portion 27 from which a pivotal rod 28 extends to the lower end of a bell-crank-lever 29 mounted upon a bracket 30 secured to one of the side members 1. A second pivotal connecting rod 31 extends from the upper end of the bell-crank-lever 29 to and intermediate an operating bar 32 pivotally mounted at its lower end adjacent a semi-circular rack 33 and provided with a releasable latch mechanism 34 engaging the notches of said rack 33. By this means the crank shaft 23 may be rocked to position the wheels 26 as desired and may be locked in any degree of adjustment.

By the foregoing description it will be readily seen that I provide a simple and inexpensive device which will efficiently serve the purpose and functions assigned thereto.

Having fully described my invention, I claim,

1. In a cotton chopper, the combination of a rotatable shaft, a frame mounted thereon, a chopping member engaging with said frame and provided with a continuously notched shank, and a locking bolt to hold said member in position, substantially as described.

2. In a cotton chopper, the combination of a rotatable shaft, a frame rigidly mounted thereon having radial slots in its face, a chopping member having a shank to engage within selected ones of said slots, said shank being continuously notched, and a locking bolt for engagement with a selected one of said notches to hold said chopping member in position substantially as described.

3. In a cotton chopper, the combination of a wheeled frame comprising side and end members, a crank shaft rotatably mounted in brackets upon said side members in the rear of the wheels of said frame, and provided with a crank portion adjacent one of said side members, said shaft further having angular extensions carrying wheels upon their ends normally free of contact with the ground, and a bell crank and operating mechanism mounted upon said side member adjacent said crank portion and connected therewith, for rocking said shaft to force said wheels carried thereby into engagement with the ground thereby raising the wheels of said frame upwardly therefrom, substantially as described.

In testimony whereof I affix my signature in presence of two witnesses.

ALEXANDER A. BULLOCK.

Witnesses:
E. A. POWELL,
C. B. BECKHAM.